United States Patent [19]

Valentic

[11] Patent Number: 5,146,408
[45] Date of Patent: Sep. 8, 1992

[54] ELECTRICAL BRAKE PRESSURE LIMITER AND CONTROLLER

[75] Inventor: James M. Valentic, Akron, Ohio

[73] Assignee: Aircraft Braking Systems Corp., Akron, Ohio

[21] Appl. No.: 99,189

[22] Filed: Sep. 21, 1987

[51] Int. Cl.$^5$ .............................................. B60T 8/60
[52] U.S. Cl. .................... 364/426.02; 303/103; 303/93; 180/197
[58] Field of Search ............. 303/103, 93, 110; 180/197; 340/52 B; 364/426.02

[56] References Cited

U.S. PATENT DOCUMENTS

| | | | |
|---|---|---|---|
| 4,404,633 | 9/1983 | Goicoechea | 364/426 |
| 4,484,282 | 11/1984 | Cook et al. | 364/426 |
| 4,494,199 | 1/1985 | Lehmann | 364/426 |
| 4,555,766 | 11/1985 | Wright | 364/426 |
| 4,610,484 | 9/1986 | Amberg et al. | 364/426 |
| 4,683,538 | 7/1987 | Guichard | 364/426 |
| 4,725,953 | 2/1988 | Rolland et al. | 364/426 |
| 4,736,994 | 4/1988 | Fennel et al. | 303/111 |
| 4,739,856 | 4/1988 | Inagaki et al. | 180/197 |

Primary Examiner—Vincent N. Trans
Attorney, Agent, or Firm—Renner, Kenner, Greive, Bobak, Taylor & Weber

[57] ABSTRACT

An electrical brake pressure limiter and controller is provided for negating the characteristic high amplitude initial torque peak of carbon brakes. The system sets an initial level of brake pressure and then controls the rate of growth of brake pressure to obtain smooth and efficient braking. A brake pedal transducer presents a signal to a microprocessor which is indicative of brake pedal position. The microprocessor compares this signal with an output signal to the brake and, dependent upon such comparison, it modifies the brake signal within controlled limits.

6 Claims, 1 Drawing Sheet

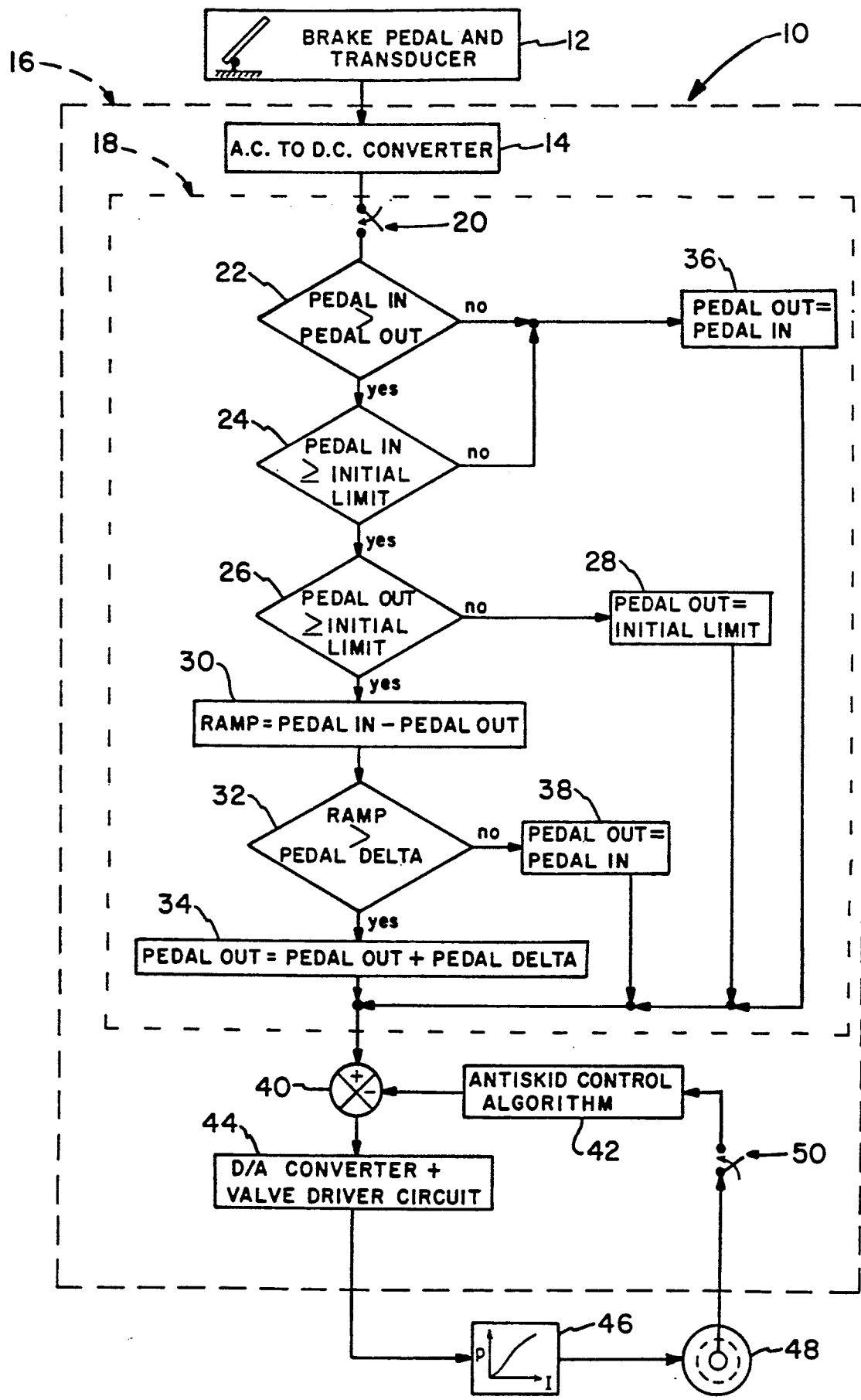

ELECTRICAL BRAKE PRESSURE LIMITER AND CONTROLLER

TECHNICAL FIELD

The invention herein resides in the art of braking systems and, more particularly, to electrical braking control systems for vehicles such as aircraft. Specifically, the invention relates to an apparatus for reducing the effect of the initial torque peak typically associated with carbon brakes.

BACKGROUND OF THE INVENTION

Heretofore it has been known that carbon brake discs are especially adapted for implementation in aircraft braking systems. However, it has equally become apparent that carbon brake systems demonstrate an initial torque peak of high amplitude. Accordingly, the first application of the brakes upon landing often results in a deep skid, causing the antiskid system of the aircraft to initialize its modulator at a level characterized by the inordinately high torque characteristic of the carbon brake on initial application. As is well known in the art, the modulator serves to control the average brake pressure during the braking operation and, if initialized as a function of a brake characteristic which terminates after the initial brake application, reduces the efficiency of the overall braking system. Of course, it is well known in the art that the high torque characteristic of carbon brakes substantially disappears after the first brake application and, in that regard, is substantially a transient signal.

There is accordingly a need in the art to negate the effect of the high torque transient of carbon brakes in order to achieve more efficient operation of the antiskid signal earlier in the braking operation for more effective braking of the vehicle.

DISCLOSURE OF THE INVENTION

In light of the foregoing, it is a primary aspect of the invention to provide an electrical brake pressure limiter and controller which serves to improve antiskid performance during system initialization by reducing the effect of the initial torque peak typically association with carbon brakes.

It is another aspect of the invention to provide an electrical brake pressure limiter and controller which does not affect braking during taxiing.

Still a further aspect of the invention is to provide an electrical brake pressure limiter and controller which may be readily implemented with state-of-the-art electrical brake systems as utilized in aircraft.

The foregoing and other aspects of the invention which will become apparent as the detailed description proceeds are achieved by an electrical brake pressure limiter and controller, comprising:

a brake pedal;

first means connected to said brake pedal for producing a first signal corresponding to a position of depression of said brake pedal;

second means connected to said first means, receiving said first signal and generating therefrom a second signal, said second signal being limited as to both initial amplitude and rate of increase in amplitude;

a valve driver receiving said second signal and generating a brake control signal therefrom; and a brake valve receiving said brake control signal and controlling application and release of brake pressure to a brake as a function thereof.

DESCRIPTION OF DRAWING

For complete understanding of the objects, techniques and structure of the invention reference should be had to the following detailed description and accompanying drawing wherein there is shown a schematic diagram of the invention.

BEST MODE FOR CARRYING OUT THE INVENTION

Referring now the drawing, it can be seen that a brake pressure limiter and controller circuit according to the invention is designated generally by the numeral 10. A brake pedal and transducer 12 is provided for pilot actuation in order to achieve braking operation. While various type known transducers including optical transducers may be applied to the invention, for the purposes of this description, the brake pedal is shown interconnected with a linear variable differential transformer (LVDT) which presents an AC output having an amplitude determined by the brake pedal position. The AC output of the brake pedal and transducer 12 is passed to an AC to DC converter 14 in which the brake signal is converted to a DC signal having an amplitude corresponding to brake pedal position. As shown, the converter 14 is part and parcel of an electronic brake control unit 16 which also includes as a portion thereof a microprocessor 18, the control algorithm of which is shown in flow chart form in the drawing.

A sample period T for sampling data from the converter 14 corresponding to brake pedal position is illustratively designated by the numeral 20. Suffice it to say that the microprocessor 18 samples data from the converter 14 at a rate dependent upon the sample period T.

As used in the description hereafter, the following definitions will apply. "Pedal in" is the present signal level from the brake pedal transducer 12 as provided through the converter 14. The "initial limit" is the pedal signal limit which represents the maximum pressure which can be initially applied. The "pedal delta" is that increment added to the "pedal out" signal each sample period which controls the pressure application rate from the "initial limit" to the maximum metered pressure. Finally, "pedal out" is the modified pedal signal input to the valve driver summing function to be discussed below.

Upon initial brake application, the pedal in signal is compared to the pedal out signal at the logic block 22 and, if found to be greater, is also compared against the initial limit which is set at a percentage of the maximum incoming pedal signal, such percentage being dependent upon the brake system characteristics, aircraft parameters, and the like. If the pedal in signal is greater than the initial limit as determined at logic block 24, then the pedal out signal is compared against the initial limit at logic block 26. On the first pass through the algorithm of 18, the pedal out signal is 0 and, accordingly, the pedal out signal is set to equal the initial limit at 28. On the next pass through the algorithm, the comparison made at logic block 26 would typically result in an affirmative decision, in which case the function at 30 would be performed.

In function block 30, the difference between the pedal in and pedal out signals is determined and designated as "ramp." In logic block 32, this difference is compared against pedal delta and if the difference is greater than pedal delta, then the pedal out signal is incremented by pedal delta at function block 34. If the ramp signal is not greater than pedal delta, then the pedal out signal is set to equal the pedal in signal as at function block 38. Finally, it will be noted that, in the event the pedal in signal is not greater than the pedal out signal, indicating that the pilot has reduced brake pressure, then function block 36 dictates that the pedal out signal be set to equal the pedal in signal.

It should now be appreciated that the algorithm of the microprocessor 18 is adapted to accomodate all types of braking functions demanded by the pilot including taxiing and increases and decreases in brake pressure or brake torque demand. It should also be appreciated that the initial limit allows for a minimal application of brake pressure initially such that the high transient torque characteristics of the carbon brakes are greatly reduced, as are their effects on the antiskid system. Accordingly, the antiskid system associated with the braking system just described is allowed to initialize at a more effective level than had the braking system experienced a deep skid from its initial brake application.

The pedal out circuit is passed to the summer 40 where it is combined with the antiskid signal from the antiskid control algorithm 42. The output of the summer 40 is applied to a digital-to-analog converter and valve driver circuit 44 which provides appropriate valve current to the brake control valve 46. In standard fashion, the valve 46 accordingly controls the application and release of brake pressure at the wheel and brake assembly 48. Finally, it will be noted that the wheel speed of the wheel and brake assembly 48 is monitored over an appropriate sample period T designated by the switch 50.

Thus it can be seen that the objects of the invention have been satisfied by the structure presented herein above. While in accordance with the patent statutes only the best mode and preferred embodiment of the invention has been presented and described in detail, it will be appreciated that the invention is not limited thereto or thereby. Accordingly, for an appreciation of the true scope and breadth of the invention references should be had to the following claims.

What is claimed is:

1. An electrical brake pressure limiter and controller, comprising:
   a brake pedal;
   first means connected to said brake pedal for producing a first signal corresponding to a position of depression of said brake pedal;
   second means connected to said first means, receiving said first signal and generating therefrom a second signal, said second signal being limited as to both initial amplitude and rate of increase in amplitude, said second means including means for comparing said first signal with said second signal and setting said second signal to equal said first signal if said first signal is less than said second signal, said second means including means for comparing said first signal with an initial limit and setting said second signal to equal said first signal if said first signal is less than said initial limit, said second means including means for comparing said second signal with said initial limit and setting said second signal to equal said initial limit if said second signal is less than said initial limit;
   a valve driver receiving said second signal and generating a brake control signal therefrom; and
   a brake valve receiving said brake control signal and controlling application and release of brake pressure to a brake as a function thereof.

2. The apparatus according to claim 1 wherein said first means comprises a linear variable differential transformer.

3. The apparatus according to claim 1 wherein said second means includes means for determining the difference between said first and second signals.

4. The apparatus according to claim 3 wherein said second means includes means for comparing said difference with an incremental value and, if said difference is greater than said incremental value, increasing said second signal by said incremental value.

5. The apparatus according to claim 4 wherein said means for comparing said difference with an incremental value sets said second signal to equal said first signal in the event said difference is less than said incremental value.

6. The apparatus according to claim 5 which further includes a summer, summing said second signal with an antiskid signal.

* * * * *